United States Patent
Qiao et al.

(10) Patent No.: US 9,952,785 B2
(45) Date of Patent: Apr. 24, 2018

(54) ENABLING NON-VOLATILE RANDOM ACCESS TO DATA

(71) Applicant: EMC Corporation, Hopkinton, MA (US)

(72) Inventors: Kenny Honglin Qiao, Beijing (CN); Youbing Li, Beijing (CN); Colin Yong Zou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/882,931

(22) Filed: Oct. 14, 2015

(65) Prior Publication Data

US 2016/0110127 A1  Apr. 21, 2016

(30) Foreign Application Priority Data

Oct. 17, 2014  (CN) .......................... 2014 1 0562076

(51) Int. Cl.
*G06F 3/06* (2006.01)
*G06F 11/07* (2006.01)

(52) U.S. Cl.
CPC ............ *G06F 3/0619* (2013.01); *G06F 3/065* (2013.01); *G06F 3/067* (2013.01); *G06F 3/0632* (2013.01); *G06F 11/0712* (2013.01); *G06F 11/0745* (2013.01)

(58) Field of Classification Search
CPC ...... G06F 3/0619; G06F 3/0632; G06F 3/067; G06F 3/065; G06F 11/0712; G06F 11/073; G06F 11/0745
See application file for complete search history.

(56) References Cited

U.S. PATENT DOCUMENTS

| | | | | |
|---|---|---|---|---|
| 6,502,205 B1 * | 12/2002 | Yanai | ................... | G06F 3/0601 714/6.32 |
| 7,600,125 B1 * | 10/2009 | Stringham | .......... | G06F 11/1004 380/229 |
| 9,032,248 B1 * | 5/2015 | Petty | ................... | G06F 11/2038 714/11 |
| 9,239,689 B2 * | 1/2016 | Baron | ................... | G06F 3/0647 |
| 2005/0027892 A1 * | 2/2005 | McCabe | ............... | G06F 3/0626 709/253 |
| 2009/0182929 A1 * | 7/2009 | Hwang | ................... | G06F 9/461 711/6 |
| 2011/0265085 A1 * | 10/2011 | Kedem | ............... | G06F 9/45558 718/1 |
| 2012/0017027 A1 * | 1/2012 | Baskakov | ............... | G06F 12/08 711/6 |
| 2013/0282653 A1 * | 10/2013 | Tandra Sistla | ...... | G06F 9/45558 707/610 |
| 2014/0164723 A1 * | 6/2014 | Garthwaite | ............. | G06F 12/16 711/162 |

(Continued)

*Primary Examiner* — Hal Schnee
(74) *Attorney, Agent, or Firm* — Krishnendu Gupta; Konrad R. Lee (57) ABSTRACT

Embodiments of the present disclosure relate to a method, computer program product and a system for enabling non-volatile random access to data where in response to receiving data from a client, causing the data to be written into a memory of a primary virtual machine and a memory of a mirror virtual machine; and in response to the primary virtual machine losing the data, recovering the data based on data in the memory of the mirror virtual machine.

20 Claims, 5 Drawing Sheets

(56) References Cited

U.S. PATENT DOCUMENTS

2014/0244949 A1\* 8/2014 Abali ................... G06F 3/065
  711/162
2014/0281151 A1\* 9/2014 Yu ............................ G06F 1/30
  711/103

\* cited by examiner

ENABLING NON-VOLATILE RANDOM ACCESS TO DATA

RELATED APPLICATION

This application claims priority from Chinese Patent Application Number CN201410562076.3 filed on Oct. 17, 2014 entitled "METHOD AND APPARATUS FOR ENABLING NON-VOLATILE RANDOM ACCESS OF DATA" the content and teachings of which is herein incorporated by reference in its entirety.

FIELD OF THE INVENTION

Embodiments of the present invention generally relate to data storage.

BACKGROUND OF THE INVENTION

In the data storage field, generally Random Access Memory (RAM) may be a common data memory. Typically, data stored in RAM may be lost after or when a RAM may be turned off, which is undesirable. In contrast, however, Non-Volatile RAM (NVRAM) may be a random access memory where stored data may not be lost even after power-off. Generally, NVRAM may have the following advantages: running speed may be fast, for example, an acknowledgement comes to a client once data from the client reaches NVRAM without waiting to be stored in a disk; data stability may be high, for example, the data loss risk may be reduced in case of system powerdown, and so on.

For a virtual machine in a virtual architecture, however, NVRAM may be unavailable and thus may be adverse to high-speed and stable storage of data under the virtual architecture. Some solutions may have been proposed by using conventional techniques, such as disk-based NVRAM solution and flash-based NVRAM solution. According to disk-based NVRAM solution, data may need to be stored in a physical storage device, so a low running speed and a large latency may be caused and the system performance may be reduced to a relatively large extent. For flash-based NVRAM solution, since its erasable times may be rather finite, the read/write lifespan may be low and its utility may be reduced to a relatively large extent.

SUMMARY OF THE INVENTION

According to embodiment of the present disclosure, there is provided a system, a computer program product and a method of enabling non-volatile random access to data, by causing the data to be written into a memory of a primary virtual machine and a memory of a mirror virtual machine, in response to receiving data from a client,; and in response to the primary virtual machine losing the data, recovering the data based on data in the memory of a minor virtual machine.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

Throughout the figures, the same or corresponding numerals refer to the same or corresponding parts.

DETAILED DESCRIPTION

Hereinafter, principles and spirit of the present disclosure will be described with reference to several exemplary embodiments shown in the drawings various. It should be understood that provision of these embodiments is only to enable those skilled in the art to better understand and further implement the present disclosure but not to limit the scope of the present disclosure in any manner.

In view of some of the potential problems discussed above, there may be a need for a solution that enables non-volatile random access to data. In one embodiment there is provided a system, a computer program product and a method for enabling non-volatile random access to data. In a further embodiment, in response to data that may be received from a client, the data may be caused to be written into a memory of a primary virtual machine and a memory of a minor virtual machine. In a further embodiment in response to the data that may be lost by the primary virtual machine, the data may be recovered based on data in the memory of the minor virtual machine.

In a further embodiment, there may be an apparatus provided for enabling non-volatile random access to data. In a further embodiment, a data storing unit may be configured to, in response to data that may be received from a client; the data may be caused to be written into a memory of a primary virtual machine and a memory of a minor virtual machine. In a further embodiment, a data recovering data may be configured to, in response the data that may be lost in the primary virtual machine, the data may be recovered based on data in the memory of the minor virtual machine.

In a further embodiment, as to be understood from description below, advantages of the NVRAM apparatus may be accomplished with low cost, high performance and high reliability of software. In a further embodiment, compared with the conventional solutions, embodiments disclosed herein may leverage virtual machines under a virtual architecture and thus no specific hardware device may be needed, which may effectively reduce implementation costs. In a further additional embodiment, RAM of virtual machines may be used for storing data and adopt high-speed networking between primary and minor virtual machines for increasing storage speed, thereby high performance may be achieved. In a further embodiment, high reliability may be achieved through redundancy brought about by a plurality of virtual machines.

Figure 1:
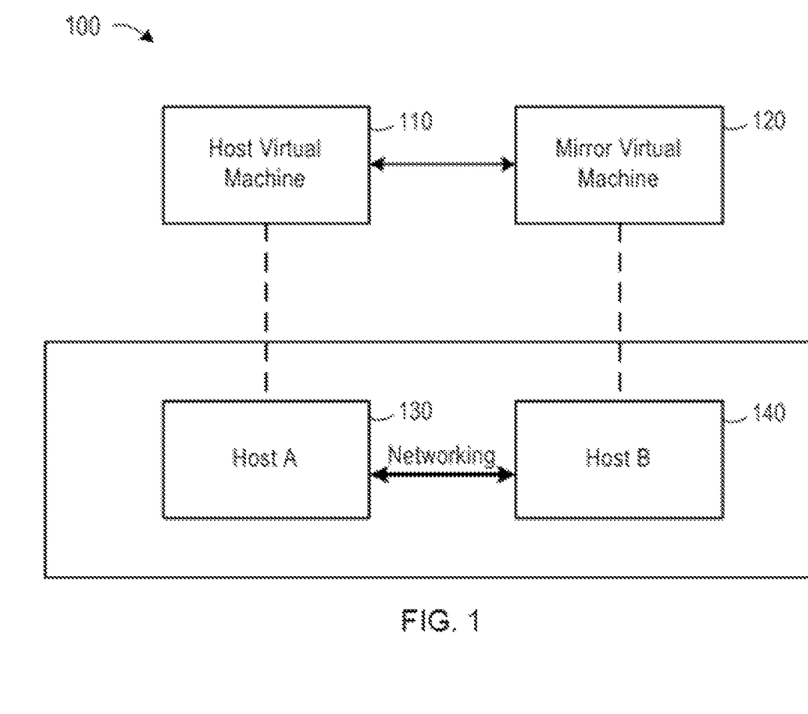
FIG. 1 shows a block diagram of a virtual architecture environment enabling non-volatile random access to data according to one exemplary embodiment of the present disclosure.

Reference is first made to FIG. 1, which shows a block diagram of a virtual architecture environment 100 enabling non-volatile random access to data according to one exemplary embodiment of the present disclosure. As shown in this figure, in the environment 100 there are two virtual machines 110 and 120 located on different physical hosts 130 and 140 respectively. These hosts are connected with high-speed networking and may be connected to the same or different power supplies. According to embodiments of the present disclosure, virtual machine 110 is called as a "primary virtual machine", and other virtual machine 120 that cooperates with primary virtual machine 110 to enable non-volatile random access to data is called as a "mirror virtual machine" or "backup virtual machine". As shown in FIG. 1, primary virtual machine 110 is served by host A 130, minor virtual machine 120 is served by host B 140, and host A 130 is connected with host B 140 via a high-speed network.

In environment 100, primary virtual machine 110 may communicate with mirror virtual machine 120 for cooperation. As an example, primary virtual machine 110 may write data into a local memory and replicate those data to the memory (e.g., RAM) of mirror virtual machine 120 through a high-speed network (for example, using 10 Gbps infinite band technique (InfiniBand)) so as to reduce the data exchange latency between virtual machines. Upon power outage or system crash, primary virtual machine 110 may recover data locally on the basis of data stored in the memory of the mirror virtual machine. In this manner, volatile memories of primary virtual machine 110 and mirror virtual machine 120 together serve as intermediate storage devices for virtual machines, thereby achieving NVRAM functionality without physical NVRAM devices.

Note the number of each component part shown in environment 100 is merely for illustration and not intended to limit the scope of the present disclosure. For example, there may be any number of minor virtual machines 120, and accordingly there may be any number of hosts B 140 for serving minor virtual machines.

In addition, it is to be noted that host A 130 for serving primary virtual machine 110 and host B 140 for serving mirror virtual machine 120 may be different hosts or the same host. If host A 130 and host B 140 are the same host, primary virtual machine 110 and minor virtual machine 120 are served by the same host, which does not affect communication and cooperation between them and the NVRAM functionality can be achieved as well.

In addition, it is to be noted that host A 130 and host B 140 may be located in the same or different power domains. If host A 130 and host B 140 are located in different power domains, when the power supply of a host may be powered down incidentally, normal operation of the other host will not be affected. In this way, high stability is provided.

According to embodiments of the present disclosure, host A 130 and host B 140 may have respective uninterrupted power supplies (UPS). According to embodiments of the present disclosure, primary virtual machine 110 and minor virtual machine 120 may have virtual disks supported by high-performance storage arrays, so as to asynchronously save to-be-stored data from memories to disks.

Figure 2:
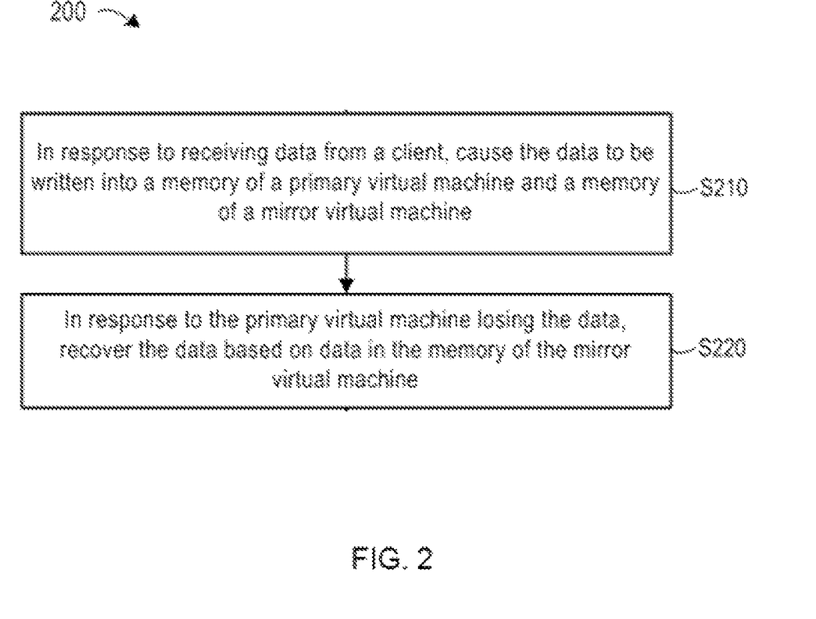
FIG. 2 shows a flowchart of a method of enabling non-volatile random access to data according to one exemplary embodiment of the present disclosure.

Reference is now made to FIG. 2, which shows a flowchart of method 200 for enabling non-volatile random access to data according to one exemplary embodiment of the present disclosure. Method 200 may be performed by primary virtual machine 110 (FIG. 1) or a device associated with primary virtual machine 110 (FIG. 1) in other manners.

In response to receiving data from a client, the data is caused to be written into a memory of a primary virtual machine and a memory of a minor virtual machine respectively (Step S210). And, in response to the primary virtual machine losing the data, the data is recovered based on data stored in the memory of the mirror virtual machine (Step S220).

According to one embodiment, various approaches may be used to cause data to be written into a memory of a primary virtual machine and a memory of a mirror virtual machine respectively. In one embodiment, in response to receiving data from a client, data may be transmitted from a primary virtual machine to a mirror virtual machine so that data may be written into a memory of a minor virtual machine. In a further embodiment, in response to an acknowledgement message from a minor virtual machine that data may have been successfully written, data may be written into a memory of a primary virtual machine. According to a further embodiment, memories of a primary virtual machine and a mirror virtual machine may comprise RAMs or other appropriate memories, respectively.

In another embodiment, in response to receiving data from a client, data may be written into a memory of a primary virtual machine. In a further embodiment, data may be transmitted from a primary virtual machine to a mirror virtual machine so that data may be written into a memory of a minor virtual machine.

According to another embodiment, after data may have been successfully written into memories of a primary virtual machine and a minor virtual machine, an acknowledgement message of data write success may be sent to a client to indicate data may have been successfully written. In a further embodiment, non-volatile random inaccessibility to data may be avoided, due to data that may be only written into one of a primary virtual machine and a mirror virtual machine.

According to another example embodiment, where a network connection may be interrupted for a while, it may be possible that a minor virtual machine may be unreachable to a primary virtual machine. In a further embodiment, during occurrence of these cases, at step S210, data may be written at a check point into a disk of a primary virtual machine, for example, may be periodically written into the disk. In a further embodiment, even if there may be data loss, it may only be within a small check point interval. In a further embodiment, data loss may be effectively reduced. In a further embodiment, a check point may be preset by those skilled in the art as required.

According to a further embodiment, at a mirror virtual machine, data may also be written into a disk of a mirror virtual machine at a predefined check point. In a further embodiment, data loss at a mirror virtual machine may be effectively reduced.

In one embodiment, data loss at a primary virtual machine may be caused by various reasons. In an example embodiment, on sudden power outage or system crashes, a primary virtual machine may usually have no chance to clean a file system before being turned off. In a further embodiment, data in a memory of a primary virtual machine may be lost. In a further embodiment, data may be recovered based on data stored in a memory of a mirror virtual machine. In a further embodiment, a primary virtual machine may be restarted first. In a further embodiment, initialization may be performed at a primary virtual machine to reserve a primary storage space for data recovery. In a further embodiment, a primary virtual machine may reconnect with a mirror virtual machine to read data stored in a memory of a mirror virtual machine. In a further embodiment, a primary virtual machine may store read data to a primary storage space for data recovery.

In an optional embodiment, a solution for enabling non-volatile random access to data may further comprise processing in several scenarios in a storage system, such as initialization, unreachability of the mirror virtual machine, normal power-off of a primary virtual machine, normal power-off of a mirror virtual machine, etc. Relevant details will be described below.

Figure 3:
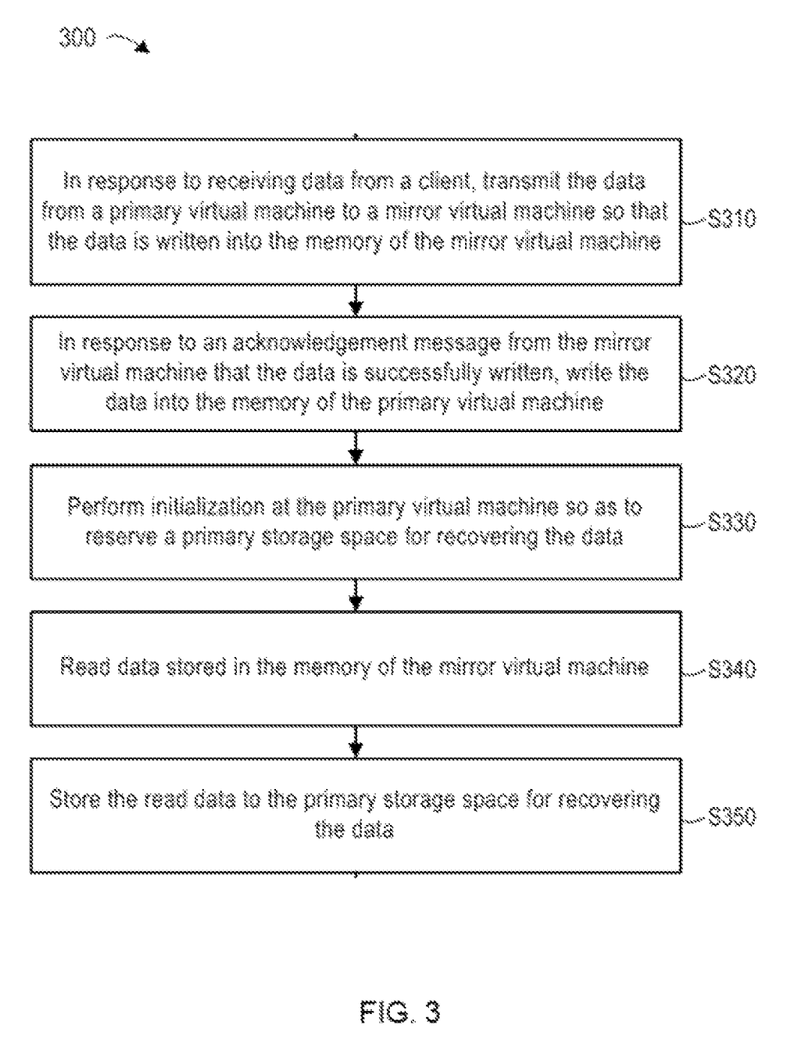
FIG. 3 shows a flowchart of a method of enabling non-volatile random access to data according to one exemplary embodiment of the present disclosure.

Reference is now made to FIG. 3, which shows a flowchart of a method 300 for enabling non-volatile random access to data according to one exemplary embodiment of the present invention. Method 300 is an implementation of method 200 that has been described with reference to FIG. 2. In method 300, data is first transmitted from a primary virtual machine to a mirror virtual machine. After data is written into the memory of the minor virtual machine, the minor virtual machine sends an acknowledgement message to the primary virtual machine. In response to the acknowledgement message, the primary virtual machine writes the data into a local memory, and thereby the entire data write operation is completed. Method 300 may be performed by the primary virtual machine 110 or a device associated with the primary virtual machine 110 in other manners.

With reference to FIG. 3, at step S310 in response to receiving data from a client, data is transmitted from a primary virtual machine to a mirror virtual machine so as to be written into the memory of the mirror virtual machine. At step S320, in response to an acknowledgement message from the minor virtual machine that the data is successfully written, the data is written into the memory of the primary virtual machine. At step S330, in response to the primary virtual machine losing data, initialization is performed at the primary virtual machine so as to reserve a primary storage space for data recovery. At step S340, the data stored in the memory of the mirror virtual machine is read. At step S350, the read data is stored to the primary storage space for data recovery.

According to embodiments of the present disclosure, after a primary virtual machine suddenly powers down or a system crashes, a minor virtual machine may not be able to receive a heartbeat message from a primary virtual machine. In a further embodiment, at that time, a mirror virtual machine may keep data in a local memory for use by a primary virtual machine for data recovery. In a further embodiment, after a primary virtual machine reboots, with respect to those data lost by a primary virtual machine due to a sudden power down or system crash, a primary virtual machine may recover them based on data stored in a memory of a mirror virtual machine. In a further embodiment, recovery may be executed through the following steps S330 to S350, for example.

Optionally, the method according to embodiments of the present disclosure may further comprise a process of initialization. In one embodiment, initialization may be performed at the primary virtual machine so as to reserve primary storage space for the data, and then a primary virtual machine may notify a mirror virtual machine to reserve a mirror storage space for the data, wherein the primary storage space and the mirror storage space have the same structure. According to embodiments of the present disclosure, a structure of a primary storage space and a mirror storage space may be implemented in various ways, which may be designed in advance by those skilled in the art as needed or according to system requirements. In an example embodiment, a storage space may be designed to have a header and multiple data sections, wherein the header may store relevant information.

In one embodiment, after the process of initialization ends, optionally, consistency check may be applied to a primary storage space and a mirror storage space, so that the primary storage space and the mirror storage space may be kept consistent after initialization. In the embodiments of the present disclosure, a consistency check may be implemented in various manners. In one embodiment, whether a primary storage space and a mirror storage space have consistency may be determined by checking their structures, sizes, header information, length of data segments, and so on.

In one example embodiment, before performing the process of initialization, optionally, information may be exchanged between a primary virtual machine and a mirror virtual machine, which may be implemented by sending a heartbeat message. In one embodiment, by sending heartbeat messages respectively, a primary virtual machine and a mirror virtual machine may learn a presence of the other party and exchange their respective status information.

In one optional embodiment, the method according may further comprise a process of treatment of a scenario where a mirror virtual machine is unreachable. In a further embodiment, the mirror virtual machine may be unreachable and this may be caused by several factors, such as latency or fault of network connection, and so on. In a further embodiment, a primary virtual machine may probably not be normally connected to a mirror virtual machine and thus considers the mirror virtual machine is unreachable. In one embodiment, if a mirror virtual machine may be unreachable, a primary virtual machine may stop writing data into a mirror virtual machine and may store the data into a disk of a primary virtual machine. In a further embodiment, after this situation ends, a primary virtual machine may notify a mirror virtual machine to re-synchronize data and replicate data from a disk of a primary virtual machine to a memory of a primary virtual machine, and may transmit data in a memory of a primary virtual machine to a mirror virtual machine. In a further embodiment, for a mirror virtual machine, in this case, it may detect a reachability of a primary virtual machine, and in response to a primary virtual machine notifying to re-synchronize data, may store the data from a primary virtual machine to a memory of a mirror virtual machine. In one example embodiment, for 4 GB data, it might take about 20 seconds to copy data from a disk to a memory and might take less than 10 seconds to transmit data from a primary virtual machine to a mirror virtual machine over a 10 Gb networking.

In an alternate embodiment, if a mirror virtual machine is unreachable, a primary virtual machine may not store data to a disk of a primary virtual machine while stopping writing the data into a mirror virtual machine. In a further embodiment, a primary virtual machine may not back up data when a mirror virtual machine is unreachable. In a further embodiment, a primary virtual machine may not use a mirror virtual machine to recover data upon power down or system crash.

In an optional embodiment, the method may further comprise a process of treatment of a scenario where a primary virtual machine may be turned off normally. In one embodiment, if a primary virtual machine is turned off normally, a primary virtual machine may store data to a disk of a primary virtual machine and notify a mirror virtual machine to stop detecting whether a primary virtual machine may be present. In a further embodiment, a mirror virtual machine may stop sending heartbeat messages and wait for a synchronization message that may be sent after a primary virtual machine boot to re-synchronize.

In an optional embodiment, the method may further comprise a process of treatment of a scenario where the mirror virtual machine may be turned off normally. In one embodiment, if a minor virtual machine may be turned off normally, a primary virtual machine may store data to a disk of a primary virtual machine and detect a boot situation of a mirror virtual machine. In a further embodiment, after a minor virtual machine may reboot, a primary virtual machine may notify a minor virtual machine to re-synchronize data, replicate data from a disk of a primary virtual machine to a memory of a primary virtual machine, and transmit data in a memory of a primary virtual machine to a mirror virtual machine. According to embodiments of the present disclosure, after a mirror virtual machine may reboot, a minor virtual machine may store data from a primary virtual machine to a memory of a minor virtual machine in response to a primary virtual machine notifying to re-synchronize the data.

In an optional embodiment, the method may further comprise a process of treatment of sudden powerdown or system crash of a minor virtual machine. In a further embodiment, if a minor virtual machine is powered down suddenly or its system crashes, the primary virtual machine may handle as a mirror virtual machine may be unreachable. In an example embodiment, a primary virtual machine may stop writing data into a mirror virtual machine and may store data to a disk of a primary virtual machine. In a further embodiment, after a mirror virtual machine may reboot, a primary virtual machine may notify a minor virtual machine to re-synchronize data, replicate data from a disk of a primary virtual machine to a memory of a primary virtual machine, and transmit data in a memory of a primary virtual machine to a minor virtual machine. In a further embodiment, after the reboot, a mirror virtual machine may perform resynchronization with a primary virtual machine in response to receiving a resynchronization notification from a primary virtual machine.

Figure 4:
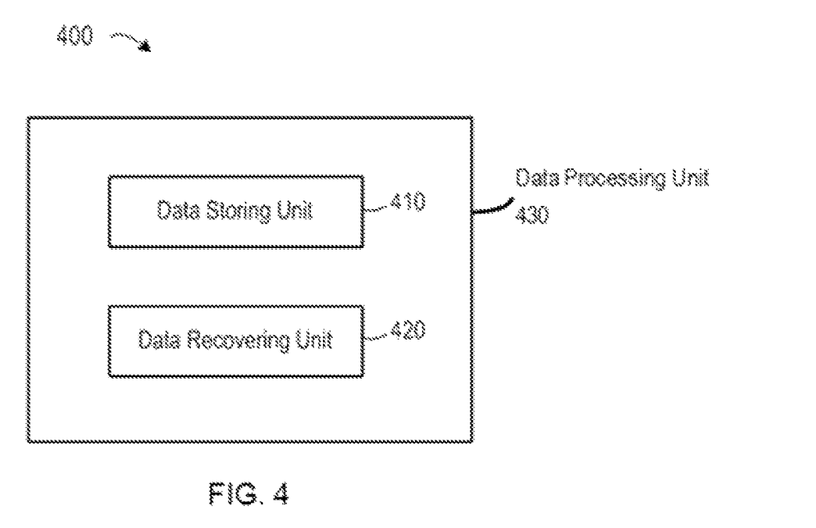
FIG. 4 shows a block diagram of an apparatus for enabling non-volatile random access to data according to one exemplary embodiment of the present disclosure.

Now reference is made to FIG. 4, which shows a block diagram of an apparatus 400 for enabling non-volatile random access to data according to an exemplary embodiment of the present disclosure. According to embodiments of the present disclosure, the apparatus 400 may reside on a primary virtual machine described with reference to FIG. 1 or be associated therewith in other manners.

As shown in FIG. 4, apparatus 400 includes data storing unit 410 configured to, in response to receiving data from a client, cause the data to be written into a memory of a primary virtual machine and a memory of a minor virtual machine; and data recovering data 420 configured to, in response to the primary virtual machine losing the data, recover the data based on data in the memory of the mirror virtual machine. In one embodiment, data storing unit 410 and data recovering unit 420 may be combined into a single data processing unit 430, which may be configured to singly perform the tasks of data storing unit 410 and data receiving unit 420 in a pre-determined order.

According to embodiments of the present disclosure, data storing unit 410 may include a first data transmitting unit that may be configured to, in response to receiving data from a client, transmit data from a primary virtual machine to a mirror virtual machine so that data is written into a memory of a mirror virtual machine. A further embodiment may include, a first recording unit that may be configured to, in response to an acknowledgement message from a mirror virtual machine that data may be successfully written, write data into a memory of a primary virtual machine.

According to embodiments of the present disclosure, data storing unit 410 may include a second data recording unit that may be configured to, in response to receiving data from a client, write data into a memory of the primary virtual machine. A further embodiment may include a second data transmitting unit that may be configured to transmit data from a primary virtual machine to a minor virtual machine so that data may be written into the memory of the minor virtual machine.

According to embodiments of the present disclosure, data storing unit 410 may include a sending unit that may be configured to send to a client an acknowledgement message of data write success if data may be successfully written into a memory of a primary virtual machine and a memory of a minor virtual machine.

According to embodiments of the present disclosure, data storing unit 410 may include a disk recording unit that may be configured to write at a check point the data into a disk of the primary virtual machine.

According to embodiments of the present disclosure, data recovering unit 420 may include a recovery initializing unit that may be configured to perform initialization at a primary virtual machine so as to reserve a primary storage space for recovering data. A further embodiment may include a recovery reading unit that may be configured to read data stored in a memory of a mirror virtual machine. A further embodiment may include a recovery recording unit that may be configured to record read data to a primary storage space for recovering data.

According to embodiments of the present disclosure, apparatus 400 may further include an initializing unit that may be configured to perform initialization at a primary virtual machine so as to reserve a primary storage space for data. A further embodiment may include a notifying unit that may be configured to notify a mirror virtual machine to reserve minor storage space for data, wherein a primary storage space and a mirror storage space may have the same structure.

According to embodiments of the present disclosure, apparatus 400 further includes a checking unit that may be configured to perform a consistency check on a primary storage space and a minor storage space.

According to embodiments of the present disclosure, apparatus 400 further includes an unreachability processing unit that may be configured to if the minor virtual machine may be unreachable, store data to a disk of a primary virtual machine; and after a mirror virtual machine unreachability ends, notify a minor virtual machine to resynchronize data, replicate data from a disk of the primary virtual machine to a memory of a primary virtual machine and transmit a data in the memory of a primary virtual machine to a minor virtual machine.

According to embodiments of the present disclosure, if the mirror virtual machine may be unreachable, a mirror virtual machine detects reachability of a primary virtual machine, and in response to a primary virtual machine notifying to resynchronize data, stores data from a primary virtual machine to a memory of a mirror virtual machine.

According to embodiments of the present disclosure, apparatus 400 may further include a primary virtual machine normal shutdown processing unit that may be configured to: if a primary virtual machine may be shut down normally, store data to a disk of a primary virtual machine and notify a mirror virtual machine to stop detecting whether a primary virtual machine may be present.

According to embodiments of the present disclosure, apparatus 400 may further include a mirror virtual machine normal shutdown processing unit that may be configured to: if a mirror virtual machine may be shut down normally, store data to a disk of a primary virtual machine and detect startup of a mirror virtual machine; and after a mirror virtual machine may be restarted, notify a mirror virtual machine to resynchronize data, replicate data from a disk of a primary virtual machine to a memory of a primary virtual machine and transmit data in a memory of a primary virtual machine to a mirror virtual machine.

According to embodiments of the present disclosure, after a mirror virtual machine may be restarted, a mirror virtual machine stores data from a primary virtual machine to a memory of a mirror virtual machine in response to a primary virtual machine notifying to resynchronize data.

According to embodiments of the present disclosure, a host serving a primary virtual machine may be connected with a host serving a mirror virtual machine via a high-speed network.

According to embodiments of the present disclosure, a host serving a primary virtual machine and a host serving the mirror virtual machine may be located in different power domains.

According to embodiments of the present disclosure, a host serving a primary virtual machine and a host serving a minor virtual machine may have respective uninterrupted power supplies (UPS).

For the clarity purpose, FIG. 4 does not show optional units of apparatus 400 and sub-units contained in each unit. However, it should be understood that all features described with respect to FIG. 1 are also applicable to apparatus 400 and are thus not detailed here.

It should be understood that apparatus 400 may be implemented in various forms. In an example embodiment, apparatus 400 may be implemented using software and/or firmware. In another example embodiment, apparatus 400 may be implemented as a computer program product embodied on a computer readable medium, wherein each unit may be a program module that achieves its function by computer instructions. In an alternate embodiment, apparatus 400 may be implemented partially or completely based on hardware. In an example embodiment, apparatus 400 may be implemented as an integrated circuit (IC) chip, application-specific integrated circuit (ASIC) or system on chip (SOC). Other forms that are currently known or to be developed in future are also feasible. The scope of the present disclosure is not limited in this regard.

Figure 5:
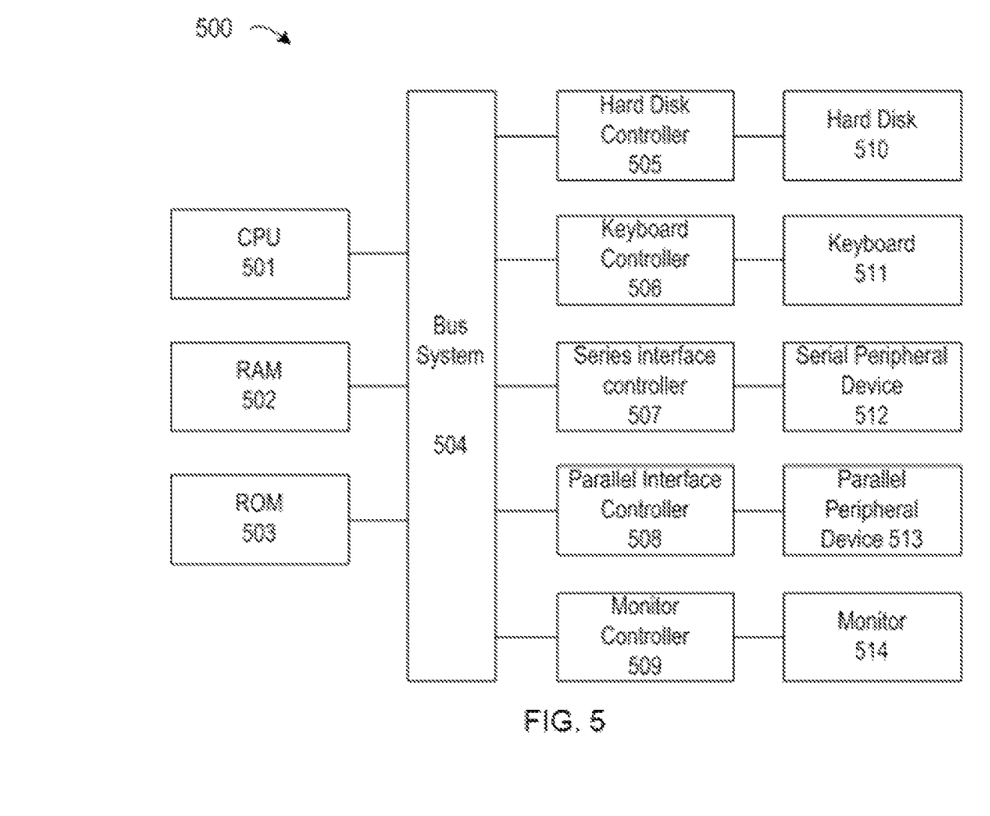
FIG. 5 shows a block diagram of a computer system which is applicable to implement the embodiments of the present disclosure.

Reference is now made to FIG. 5, which shows a schematic block diagram of a computer system 500 that is applicable to implement the embodiments of the present disclosure. As shown in FIG. 5, the computer system includes: CPU (Central Processing Unit) 501, RAM (Random Access Memory) 502, ROM (Read Only Memory) 503, system bus 504, hard disk controller 505, keyboard controller 506, serial interface controller 507, parallel interface controller 508, monitor controller 509, hard disk 510, keyboard 511, serial peripheral device 512, parallel peripheral device 513 and monitor 514. Among these devices, connected to system bus 504 are CPU 501, RAM 502, ROM 503, hard disk controller 505, keyboard controller 506, serial interface controller 507, parallel interface controller 508 and monitor controller 509. Hard disk 510 is coupled to hard disk controller 505; keyboard 511 is coupled to keyboard controller 506; serial peripheral device 512 is coupled to serial interface controller 507; and parallel peripheral device 513 is coupled to parallel interface controller 508; and monitor 514 is coupled to monitor controller 509. It should be understood that the structural block diagram in FIG. 5 is shown only for illustration purpose, and is not intended to limit the scope of the present disclosure. In some cases, some devices may be added or reduced as required.

As above mentioned, apparatus 400 may be implemented through pure hardware, for example, chip, ASIC, SOC, etc. Such hardware may be integrated into computer system 500. Besides, embodiments of the present disclosure may also be implemented in a form of a computer program product. For example, the method of the present disclosure may be implemented via a computer program product. This computer program product may be stored in RAM 502, ROM 503, hard disk 510 and/or any suitable storage medium as illustrated in FIG. 5, or downloaded to computer system 500 from a suitable location in the network. The computer program product may comprise computer code portions comprising program instructions that may be executed through a suitable processing device (for example, CPU 501 as shown in FIG. 5). The program instruction at least may comprise instructions for implementing the steps of the method of the present invention.

It should be noted that, embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

It should be noted that although a plurality of units or subunits of the apparatuses have been mentioned in the above detailed depiction, such partitioning is merely non-compulsory. In actuality, according to the embodiments of the present disclosure, the features and functions of two or more units above described may be embodied in one unit. On the contrary, the features and functions of one unit above described may be further partitioned to be embodied in more units.

Besides, although operations of the method of the present disclosure are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A method of enabling non-volatile random access to data, the method comprising:
   in response to receiving data from a client, causing the data to be written into a memory of a primary virtual machine and a memory of a mirror virtual machine, wherein the data is written into volatile memories of the primary virtual machine and the mirror virtual machine to provide non-volatile random access functionality without physical non-volatile random access devices for the primary virtual machine or the mirror virtual machine:
   in response to the primary virtual machine losing the data, recovering the data based on data in the memory of the mirror virtual machine; and
   wherein the primary virtual machine is enabled to create checkpoints into the memory of the primary virtual machine if the mirror virtual machine is unavailable.

2. The method according to claim 1, further comprising:
   in response to receiving data from a client, transmitting the data from the primary virtual machine to the mirror virtual machine so that the data is written into the memory of the mirror virtual machine; and
   in response to an acknowledgement message from the mirror virtual machine that the data is successfully written, writing the data into the memory of the primary virtual machine.

3. The method according to claim 1, further comprising:
   in response to receiving da to from a client, writing the data into the memory of the primary virtual machine; and
   transmitting the data from the primary virtual machine to the mirror virtual machine so that the data is written into the memory of the mirror virtual machine.

4. The method according to claim 3, further comprising:
   sending to the client an acknowledge message of data write success if the data is successfully written into the memory of the primary virtual machine and the memory of the mirror virtual machine.

5. The method according to claim 3, further comprising:
   wiring, at a check point, the data into a disk of the primary virtual machine.

6. The method according to claim 1, further comprising:
   performing initialization at the primary virtual machine so as to reserve a primary storage space for recovering the data;
   reading the data stored in the memory of the mirror virtual machine; and recording the read data to the primary storage space for recovering the data.

7. The method according to claim 1, further comprising:
   performing initialization at the primary virtual machine so as to reserve a primary storage space for the data; and
   notifying the mirror virtual machine to reserve a mirror storage space for the data, wherein the primary storage space and the mirror storage space have the same structure.

8. The method according to claim 7, further comprising:
   performing consistency check to the primary storage space and the mirror storage space.

9. The method according to claim 1, further comprising:
   if the mirror virtual machine is unreachable, storing the data to a disk of the primary virtual machine, wherein if the mirror virtual machine is unreachable, the minor virtual machine detects reachability of the primary virtual machine, and in response to the primary virtual machine notifying to resynchronize the data, stores the data from the primary virtual machine to the memory of the mirror virtual machine; and
   when the mirror virtual machine unreachability ends, the primary virtual machine notifying the mirror virtual machine to resynchronize the data, replicating the data from the disk of the primary virtual machine to the memory of the primary virtual machine and transmitting the data in the memory of the primary virtual machine to the mirror virtual machine.

10. The method according to claim 1, further comprising:
    if the primary virtual machine is shut down normally, storing the data to a disk of the primary virtual machine and perform at least one of
    notifying the mirror virtual machine to stop detecting whether the primary virtual machine is present; or
    detecting startup of the mirror virtual machine; and after the mirror virtual machine is restarted, the primary virtual machine notifying the mirror virtual machine to resynchronize the data, replicating the data from the disk of the primary virtual machine to the memory of the primary virtual machine and transmitting the data in the memory of the primary virtual machine to the mirror virtual machine, and wherein after the mirror virtual machine is restarted, the mirror virtual machine stores the data from the primary virtual machine to the memory of the mirror virtual machine in response to the primary virtual machine notifying to resynchronize the data.

11. The method according to claim 1, wherein a host serving the primary virtual machine and a host serving the mirror virtual machine are
    connected via a high-speed network;
    located in different power domains; and
    have respective uninterrupted power supplies (UPS).

12. A computer program product comprising:
    a non-transitory computer readable medium encoded with computer executable program code, wherein the code enables execution across one or more processors of enabling nonvolatile random access to data, wherein the code is configured to enable execution of:
    in response to receiving data from a client, causing the data to be written into a memory of a primary virtual machine and a memory of a mirror virtual machine, wherein the data is written into volatile memories of the primary virtual machine and the mirror virtual machine to provide non-volatile random access functionality without physical non-volatile random access devices for the primary virtual machine or the mirror virtual machine;
    in response to the primary virtual machine losing the data, recovering the data based on data in the memory of the mirror virtual machine; and
    wherein the primary virtual machine is enabled to create checkpoints into the memory of the primary virtual machine if the mirror virtual machine is unavailable.

13. The computer program product according to claim 12, wherein the code is further configured to enable execution of:
    in response to receiving data from a client, transmitting the data from the primary virtual machine to the mirror virtual machine so that the data is written into the memory of the mirror virtual machine; and
    in response to an acknowledgement message from the mirror virtual machine that the data is successfully written, writing the data into the memory of the primary virtual machine.

14. The computer program product according to claim 12, wherein the code is further configured to enable execution of:
  in response to receiving da to from a client, writing the data into the memory of the primary virtual machine;
  sending to the client an acknowledgement message of data write success if the data is successfully written into the memory of the primary virtual machine and the memory of the mirror virtual machine and
  transmitting the data from the primary virtual machine to the mirror virtual machine so that the data is written into the memory of the mirror virtual machine.

15. The computer program product according to claim 12, wherein the code is further configured to enable execution of:
  writing, at a check point, the data into a disk of the primary virtual machine.

16. The computer program product according to claim 12, wherein the code is further configured to enable execution of:
  performing initialization at the primary virtual machine so as to reserve a primary storage space for recovering the data, and performing at least one of
  reading the data stored in the memory of the mirror virtual machine; and
  recording the read data to the primary storage space for recovering the data; or
  notifying the mirror virtual machine to reserve a mirror storage space for the data, wherein the primary storage space and the mirror storage space have the same structure; and
  performing consistency check to the primary storage space and the mirror storage space.

17. The computer program product according to claim 12, wherein the code is further configured to enable execution of:
  if the mirror virtual machine is unreachable, storing the data to a disk of the primary virtual machine, wherein if the mirror virtual machine is unreachable, the mirror virtual machine detects reachability of die primary virtual machine , and in response to the primary virtual machine notifying to resynchronize the data, stores the data from the primary virtual machine to the memory of the mirror virtual machine; and
  when the mirror virtual machine unreachability ends, the primary virtual machine notifying the mirror virtual machine to resynchronize the data, replicating the data from the disk of the primary virtual machine to the memory of the primary virtual machine and transmitting the data in the memory of the primary virtual machine to the mirror virtual machine.

18. The computer program product according to claim 12, wherein the code is further configured to enable execution of:
  if the primary virtual machine is shut down normally, storing the data to a disk of the primary virtual machine and perform at least one of
  notifying the mirror virtual machine to stop detecting whether the primary virtual machine is present; or
  detecting startup of the mirror virtual machine; and after the minor virtual machine is restarted, the primary virtual machine notifying the mirror virtual machine to resynchronize the data, replicating the data from the disk of the primary virtual machine to the memory of the primary virtual machine and transmitting the data in the memory of the primary virtual machine to the mirror virtual machine, and wherein after the mirror virtual machine is restarted, the mirror virtual machine stores the data from the primary virtual machine to the memory of the mirror virtual machine in response to the primary virtual machine notifying to resynchronize the data.

19. The computer program product according to claim 12, wherein a host serving the primary virtual machine and a host serving the mirror virtual machine are
  connected via a high-speed network;
  located in different power domains; and
  have respective uninterrupted power supplies (UPS).

20. A system, comprising:
  a data storage system including one or more processors, wherein the data storage system is enabled to use a hypervisor to provide at least one virtual machine; and
  computer-executable logic operating in memory, wherein the computer-executable program logic is configured to enable execution across one or more processors, wherein the computer-executable program logic is configured for the execution of:
  in response to receiving data from a client, causing the data to be written into a memory of a primary virtual machine and a memory of a mirror virtual machine, wherein the data is written into volatile memories of the primary virtual machine and the mirror virtual machine to provide non-volatile random access functionality without physical non-volatile random access devices for the primary virtual machine or the mirror virtual machine;
  in response to the primary virtual machine losing the data, recovering the data based on data in the memory of the mirror virtual machine; and
  wherein the primary virtual machine is enabled to create checkpoints into the memory of the primary virtual machine if the mirror virtual machine is unavailable.

* * * * *